United States Patent
Chapman et al.

(10) Patent No.: US 8,695,014 B2
(45) Date of Patent: *Apr. 8, 2014

(54) DISTRIBUTED FUNCTION EXECUTION FOR HYBRID SYSTEMS

(71) Applicant: International Business Machines Corporation, Armonk, NY (US)

(72) Inventors: David G. Chapman, Clinton Corners, NY (US); Rajaram B. Krishnamurthy, Wappingers Falls, NY (US); Carl J. Parris, Rhinebeck, NY (US); Donald W. Schmidt, Stone Ridge, NY (US); Benjamin P. Segal, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/665,408

(22) Filed: Oct. 31, 2012

(65) Prior Publication Data

US 2013/0191849 A1 Jul. 25, 2013

Related U.S. Application Data

(63) Continuation of application No. 13/357,650, filed on Jan. 25, 2012.

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .................................................. 719/312

(58) Field of Classification Search
None
See application file for complete search history.

(56) References Cited

U.S. PATENT DOCUMENTS

| 5,414,840 A * | 5/1995 | Rengarajan et al. ............. 1/1 |
| 2003/0210681 A1 * | 11/2003 | Sumi et al. ............. 370/352 |
| 2010/0058356 A1 | 3/2010 | Aho et al. |

(Continued)

FOREIGN PATENT DOCUMENTS

| JP | 02010061648 A | 3/2010 |
| WO | 2004036432 A1 | 4/2004 |

OTHER PUBLICATIONS

The OpenCL Specification; Verion 1.0; Revision 48; Oct. 6, 2009; 43 excerpted pages; http://www.khronos.org/registry/cl/specs/opencl-1.x-latest.pdf.*

(Continued)

*Primary Examiner* — H S Sough
*Assistant Examiner* — Kimberly Jordan
(74) *Attorney, Agent, or Firm* — Cantor Colburn LLP; William A. Kinnaman, Jr.

(57) ABSTRACT

A method includes processing an application by a host including one or more processors and distributing at least a portion of the application to an accelerator for execution. The method includes instructing the accelerator to create a buffer on the accelerator and instructing the accelerator to execute the portion of the application, wherein the accelerator writes data to the buffer. The method also includes instructing the accelerator to transmit the data in the buffer to the host before the application requests the data in the buffer. The accelerator aggregates the data in the buffer before transmitting the data to the host based upon one or more runtime conditions in the host.

7 Claims, 3 Drawing Sheets

(56) References Cited

U.S. PATENT DOCUMENTS

| | | |
|---|---|---|
| 2010/0064295 A1 | 3/2010 | Aho et al. |
| 2010/0088490 A1 | 4/2010 | Chakradhar et al. |
| 2010/0332594 A1 | 12/2010 | Sundarrajan et al. |
| 2011/0041128 A1 | 2/2011 | Kohlenz et al. |
| 2011/0067039 A1 | 3/2011 | Eilert et al. |
| 2011/0113115 A1 | 5/2011 | Chang et al. |
| 2011/0173155 A1 | 7/2011 | Becchi et al. |

OTHER PUBLICATIONS

Buffer size initialization parameters; archived May 17, 2010; 2 pages; http://web.archive.org/web/20100517091922/http://webhelp.esri.com/arcgisserver/9.3/java/geodatabases/buffer-1378245143.htm#webprint.*

Non-blocking MPI Collective Operations; archived Feb. 9, 2007; 2 pages; http://web.archive.org/web/20070209141038/http://www.unixer.de/research/nbcoll/.*

Anthony Danalis, Ki-Yong Kim, Lori Pollock, and Martin Swany; Transformations to Parallel Codes for Communication-Computation Overlap; Nov. 2005; 12 pages.*

Anthony Danalis, Lori Pollock, and Martin Swany; Automatic MPI application transformation with ASPhALT; 8 pages.*

Sevin Varoglu and Stephen Jenks; Architectural support for thread communications in multi-core processors; Sep. 2010; 16 pages.*

Nathan Clark et al, "An architecture framework for transparent instruction set customization in embedded processors". Proceedings of the 32nd International Symposium on Computer Architecture (ISCA'01), 2005.

Abstract_CN101754013 A; published Jun. 23, 2010.

International Search Report; International Application No. PCT/CN2013/070809; International Filing Date: Jan. 22, 2013; mailed May 2, 2013; 12 pages.

* cited by examiner

_US 8,695,014 B2_

DISTRIBUTED FUNCTION EXECUTION FOR HYBRID SYSTEMS

CROSS REFERENCE TO RELATED APPLICATIONS

This application is a continuation of U.S. Ser. No. 13/357,650 filed on Jan. 25, 2012, the disclosure of which is incorporated by reference herein in its entirety.

BACKGROUND

The present disclosure relates generally to distributed function execution, and more specifically, to distributed function execution for hybrid systems using OpenCL.

Open Computing Language (OpenCL) is a framework for writing programs that execute across heterogeneous platforms consisting of CPUs, Graphics Processing Units (GPUs), and other processors. OpenCL includes a language for writing kernels, which are functions that execute on OpenCL devices, and APIs that are used to define and then control the platforms. OpenCL provides parallel computing using task-based and data-based parallelism. OpenCL was designed to provide applications access to the graphics processing unit for non-graphical computing and thereby extend the power of the GPU beyond graphics.

Currently OpenCL runtime environments are not available for use with certain architectures, such as IBM's System z. In order for these architectures to utilize OpenCL, the architecture must remotely access the OpenCL runtime on a separate architecture. In a zEnterprise configuration, a System z host may call computationally intensive functions on another device, referred to generally as an accelerator. In order for a zOS address space, or zLinux process, to access the API in an OpenCL host program, a remote procedure call (RPC) scheme may be used. However, there are several drawbacks of using currently available RPC schemes in connection with OpenCL. Since OpenCL was designed to be used with a non-distributed system, OpenCL is not designed to optimize data transmission between the various processors and buffers used by the devices in the system.

BRIEF SUMMARY

According to one embodiment of the present disclosure, a method for distributed function execution on hybrid systems includes processing an application by a host including one or more processors and distributing at least a portion of the application to an accelerator for execution. The method includes instructing the accelerator to create a buffer on the accelerator and instructing the accelerator to execute the portion of the application, wherein the accelerator writes data to the buffer. The method also includes instructing the accelerator to transmit the data in the buffer to the host before the application requests the data in the buffer. The accelerator aggregates the data in the buffer before transmitting the data to the host based upon one or more runtime conditions in the host.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
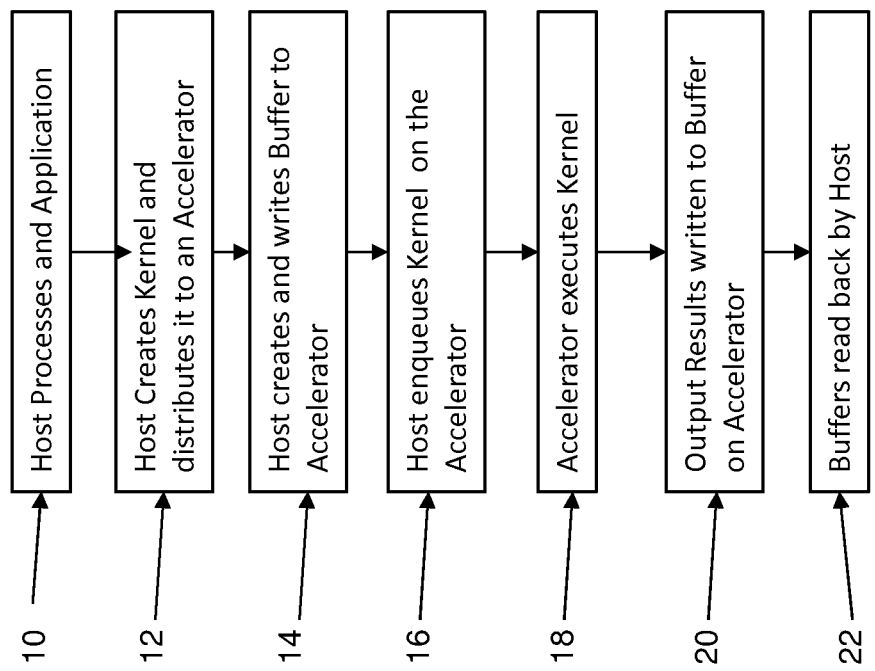
FIG. 1 is a flow diagram illustrating the operation of an OpenCL method.

With reference now to FIG. 1, a flow diagram illustrating the operation of an OpenCL method is shown. As shown at block 10, the host processes an application for execution. The host creates one or more kernels, which are portions of applications, and distributes them to one or more accelerators, as shown at block 12 under host direction. Next, as shown at block 14, the host creates and writes one or more buffers to the accelerator. The buffers may include data that is needed by the kernel for execution. Once the buffers have been created and written on the accelerator, execution kernels are enqueued by the host on the accelerator, as shown at block 16. As illustrated at block 18, the kernels then execute on the accelerator. The output results of the kernel execution are written to the buffers on the accelerator, as shown at block 20. Finally, the buffers on the accelerator may be read back by the calling host, as illustrated at block 22.

Figure 2:
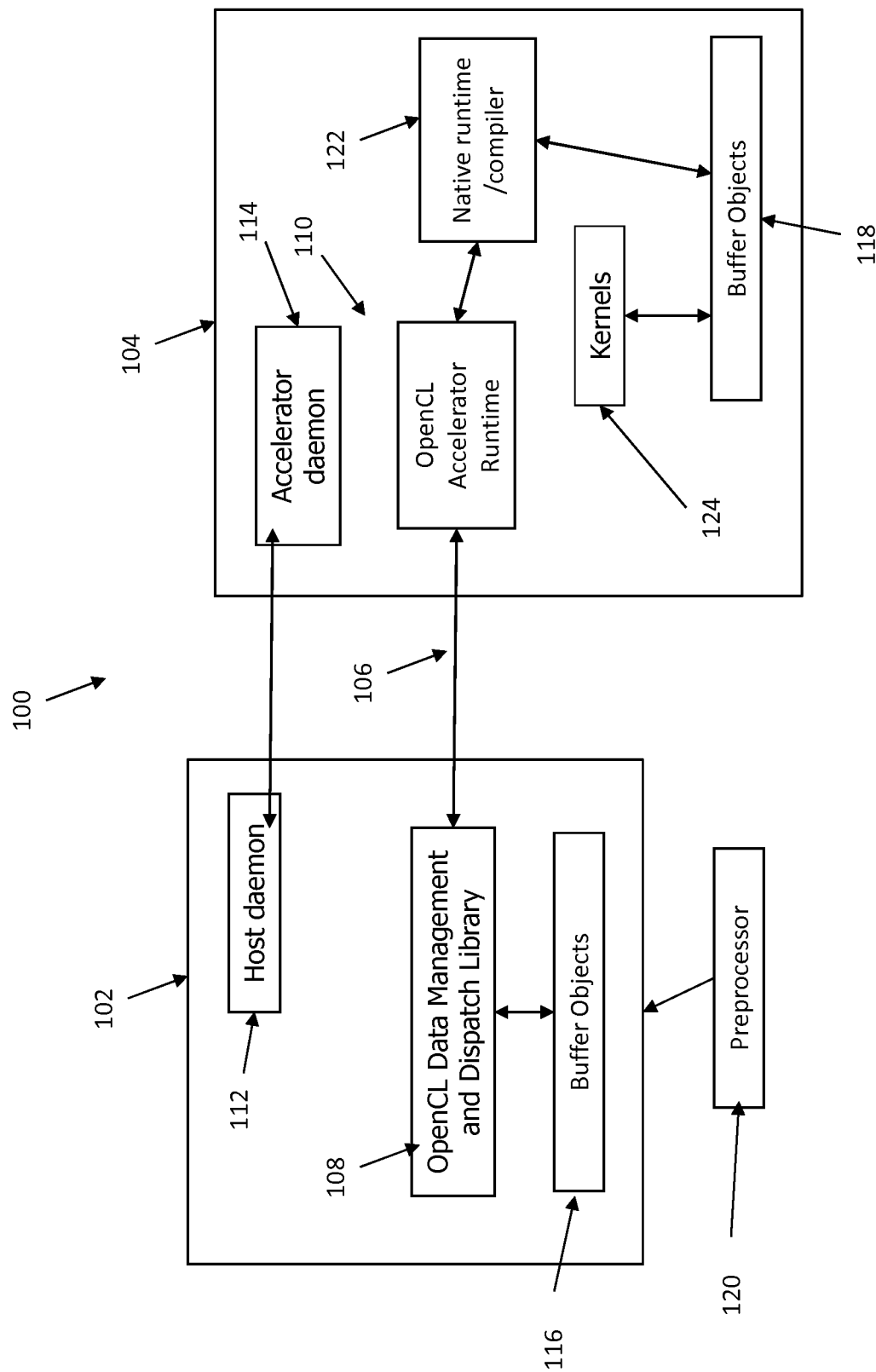
FIG. 2 is a block diagram illustrating a system for distributed function execution using OpenCL.

Referring now to FIG. 2, a block diagram of a hybrid system 100 for distributed function execution using OpenCL is illustrated. The hybrid system 100 includes a host 102 and an accelerator 104 connected via a communications link 106. In an exemplary embodiment, the host 102 may have a System z operating system (e.g. zOS or zLinux) while the accelerator 104 may have any other type of operating system (e.g. AIX or Linux). The host 102 includes a data management and dispatch library 108 that allows OpenCL source on the host 102 to call execution kernels 124 on the accelerator 104. The preprocessor 120 is run during compilation of host OpenCL source code. The preprocessor 120 performs static code analysis to determine relationships between kernel and buffer data, and their corresponding usage models. The preprocessor output is a table containing these associations. Data management and dispatch library 108 is used to control the operation of the OpenCL host program and associated accelerator kernels and data movement between host and accelerator.

In one embodiment, the host 102 and accelerator 104 may use a data communication or synchronization library (DaCS) or TCP/IP sockets as a transport layer to communicate with one another. The accelerator 104 also includes an OpenCL accelerator runtime environment 110 that an acts as a proxy for the host 102 and calls OpenCL API on behalf of the host 102. The OpenCL accelerator runtime environment 110 responds to host commands and sends event notifications back to the host. The accelerator 104 includes a native compiler 122 that may be utilized by the OpenCL accelerator runtime environment 110. The host 102 may include a host daemon 112 and the accelerator 104 may include an accelerator daemon 114 which are used to configure the communications link 106 between the host 102 and the accelerator 104 and allow management of accelerators by the host including network topology between the accelerator and the host. The host 102 includes one or more host buffers 116 and the accelerator includes one or more accelerator buffers 118. In other embodiments, DaCS may be substituted by TCP/IP, Infiniband or MPI. The accelerator daemon 112 and host daemon 114 provide control path support while the accelerator proxy 110 receives commands from the host via 108 and sends notifications using communications link 106.

In an exemplary embodiment, the data management and dispatch library 108 can determine which accelerator buffers 118 will be read back from the accelerator 104 to the host 102 after kernel execution. The data management and dispatch library 108 may instruct the OpenCL Accelerator runtime environment 110 to push these accelerator buffers 118 from the accelerator 104 to the host 102 after kernel execution. By selectively pushing the data in the accelerator buffers 118 on the accelerator 104 to the host 102 and storing the data in the host buffers 116, the data management and dispatch library 108 increases execution speed and minimizes latency by providing the host 102 with access to the data in the host buffer 116 without waiting for the host 102 to request the data from the accelerator 104. In certain instances, accelerator buffers 118 written by a kernel on the accelerator 104 may not need to be read by the host 102. For example, these accelerator buffers 118 may only be needed for execution of another kernel on the accelerator 104. If the data management and dispatch library 108 determines that the accelerator buffers 118 are not need by the host 102, the data in the accelerator buffers 118 is not sent back to the host 102 after kernel execution.

In exemplary embodiments, the preprocessor 120 may parse the application source code executing on the host 102 and create an association between instructions for writing buffers from the host 102 onto the accelerator 104 and instructions to enqueue and execute the kernel on the accelerator 104. Based upon these associations, the preprocessor 120 may aggregate the data that is transmitted from the host 102 to the accelerator 104 i.e. aggregate buffer transfer calls and kernel execution calls by a single data transfer between host and accelerator. By aggregating the data that is transmitted, the need for multiple system calls to transfer the same data from the host 102 to the accelerator 104 is reduced and may be eliminated completely.

In exemplary embodiments, one or more options may be included in an application such that the data management and dispatch library 108 can read environmental variables to trigger data aggregation and/or data push ahead. In addition, these options may allow data aggregation and/or data push ahead to be toggled by a programmer or user. In one embodiment, the data management and dispatch library 108 may create and use a table of buffers 116 created on the host 102. The data management and dispatch library 108 can verify that kernels using the buffers are actually being enqueued on the accelerator 104. For example, the data management and dispatch library 108 may use the table of buffers to track whether each accelerator buffer 118 is actually enqueued on the accelerator 104. In addition, the data management and dispatch library 108 can use a similar method to track other usage details for each buffer on the accelerator 104 e.g. if the buffer is being used for read-only data, write-only data or both for reading and writing buffer data on the accelerator. OpenCL buffers can be marked as read-only, writer-only, or read-write. The data management and dispatch library 108 can make intelligent buffer transfer decisions based on those settings. A buffer marked 'read-only" (read only by the kernel) does not need to be rewritten back to the host. Conversely, a buffer marked as 'write-only' does not need to have its contents initialized from host memory (further minimizing data transfer). In one embodiment, when the data management and dispatch library 108 encounters a buffer write instruction that will lead to a transmission of data across the communications link 106, the table of buffers can be queried and the buffer data can be flagged for transmission when a corresponding enqueue kernel instruction that includes the buffer data is encountered. In scenarios where an application sends a small amount of data in-between instructions to execute the kernel, the application may include an option that allows a user or preprocessor 120 to disable data aggregation.

Disabling data aggregation is also prudent when buffer data is being sent for a kernel being executed on the accelerator but the next enqueue kernel corresponds to a different kernel than that being executed on the accelerator. Programmer options in application source code may be used to toggle an environmental variable action during runtime. A 'start aggregate' hint entered by the programmer would aggregate data across accelerator function calls for all calls after the hint and until an 'end aggregate' hint is reached. The preprocessor 120 scans the input source and builds an aggregation table. The table has row number, input file name, source line number, API function call name, and aggregation row list and iteration range. The aggregation row list is simply all the functions corresponding to rows that will be aggregated for transfer at a certain row. Iteration range is the range of iterations for which the aggregation will hold. The preprocessor 120 builds this table and may write this to storage or main memory. The data management and dispatch library 108 may read this table to make aggregation decisions as the system is in operation. Similarly, the preprocessor 120 builds a 'push-ahead' table which contains row number, input file name, source line number, API function call name, push-ahead-flag. The programmer inserts 'push-ahead-start' hints and 'push-ahead-end' hints to section application source code requiring push ahead. The preprocessor 120 creates this table and may deposit this in storage. On startup this table is communicated to the accelerator 104 for execution. Any change in table conditions during runtime is communicated to the accelerator 104 with updates to specific row numbers. For example, for a given invocation of the OpenCL program, data aggregation environmental variables may be set in the OS environment to aggregate data but an application source may carry logic to turn off data aggregation if certain conditions are met during dynamic execution of the application source. For example, data aggregation may lead to large amounts of data being shipped from the host to the accelerator which may be inefficient in terms of data transfer. The aforementioned methods allow aggregation and push ahead requests to be toggled between compile time conditions and dynamic run-time conditions.

In exemplary embodiments, the data management and dispatch library 108 may build a table of buffers that will be read by the host 102 during the execution of the application. When a kernel is enqueued on the accelerator 104, the data management and dispatch library 108 can set a flag to indicate that the data in the accelerator buffer 118 used by the kernel should be pushed to the host 102 before the host 102 executes a read buffer instruction. In one embodiment, after the kernel executes on the accelerator 104, the data in the accelerator buffer 118 can be immediately pushed back to the host 102 and stored in the host buffer 116. The OpenCL Accelerator runtime environment 110 can be used to query the data management and dispatch library 108 to determine if the accelerator buffer 118 should be pro-actively pushed to the host 102. The data management and dispatch library 108 may also understand the buffer usage characteristics in the host 102 and command the accelerator 104 to only push the required data.

In one embodiment, a programmer may place explicit options in the application source code that can be used to selectively enable the buffer management methods, including data aggregation and data push-ahead. In one embodiment, in computation loops that iteratively execute a kernel and read a buffer, a push-ahead option can be used to push data that is aggregated across multiple of iterations of the loop from the accelerator 104 to the host 102. In one embodiment, a push-ahead-last option can be used to instruct the accelerator 104 to aggregate the data generated on the accelerator during the computational loop and push the aggregated data to the host 102 after the kernel execution is completed. In exemplary embodiments, the push-ahead-last option can be used to prevent the accelerator 104 from overwhelming the host 102 with continual transmission of data.

In an exemplary embodiment, a kernel may run for a short amount of time and the host 102 may read the accelerator buffer 118 used by the kernel after each kernel execution. In this case, there are a large number of data transmissions between the host 102 and the accelerator 104. If the host 102 does not need the result of the kernel execution immediately, in order to reduce the number of data transmissions, data pushes from the accelerator 104 to the host 102 may be aggregated upon instruction by the data management and dispatch library 108 instructing the OpenCL Accelerator runtime environment 110 to aggregate the data to a minimum quantity after which the data may be pushed from accelerator 104 to the host 102. In another embodiment, data pushes from the accelerator 104 to the host 102 may be aggregated upon instruction by data management and dispatch library 108, thereby instructing the OpenCL Accelerator runtime environment 110 to aggregate the data and transmit the data from accelerator 104 to the host 102 at a maximum transmission frequency that may be set by the preprocessor 102 e.g. the host requests only certain section of data from a buffer each iteration. A preprocessor hint using push-ahead with size and location could be used to minimize data transmission.

In another exemplary embodiment, multiple kernels may be executing on the accelerator 104 and data management and dispatch library 108 may instruct the OpenCL Accelerator runtime environment 110 to aggregate buffer pushes from different kernel executions to the host 102. In one embodiment, data aggregation may also be triggered using the OS dispatch duration on the host 102. For example, if the OS dispatcher on the host 102 runs every x milliseconds, data on the accelerator 104 may be aggregated and transmitted to the host 102 just before the host 102 attempts to read the transmitted data. Control and synchronization protocols may be used to guarantee consistency and coherence of data read by the host.

Figure 3:
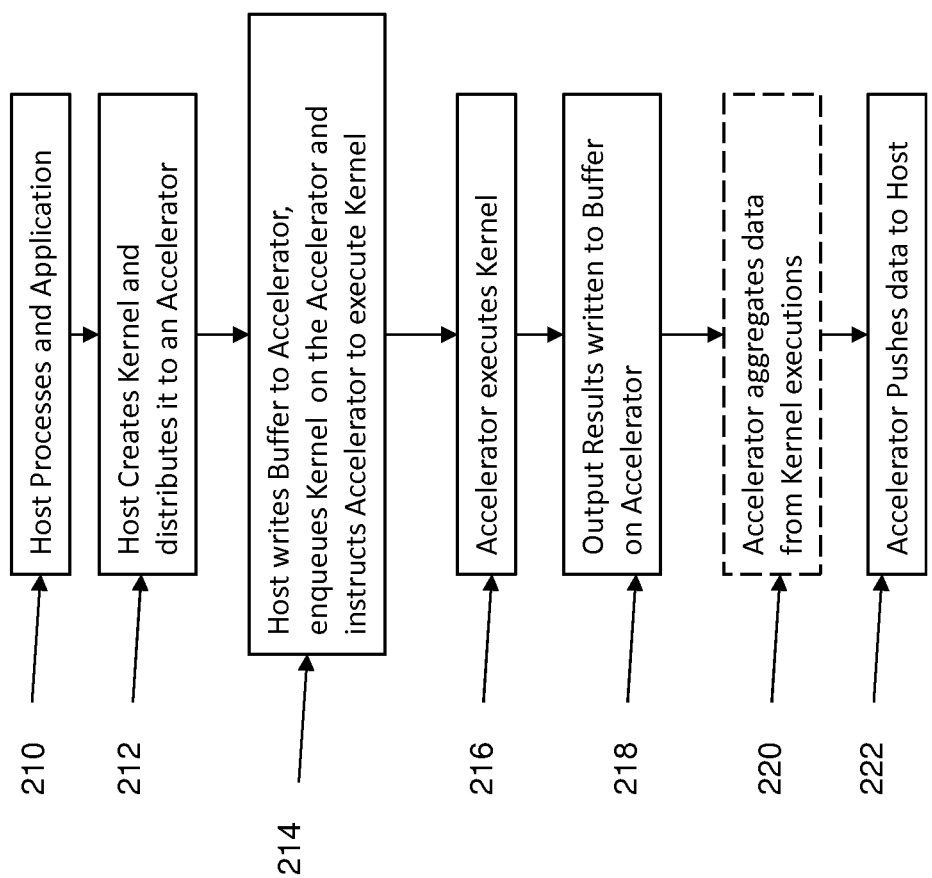
FIG. 3 is a flow diagram illustrating a method for distributed function execution on hybrid systems.

Referring now to FIG. 3, a flow diagram illustrating a method for distributed function execution on hybrid systems is shown. As shown at block 210, the host processes an application for execution across the distributed system. The host creates one or more kernels, which are portions of the application, and distributes them to one or more accelerators, as shown at block 212. Next, as shown at block 214, the host creates and writes one or more buffers to the accelerator, enqueues kernels on the accelerator and instructs accelerator to execute the kernel. In an exemplary embodiment, the host may use a data management and dispatch library 108 to aggregate the data that is transmitted from the host to the accelerator during the steps of writing the buffers to the accelerator, enqueueing the kernels and instructing the accelerator to execute the kernels. As illustrated at block 216, the kernels then execute on the accelerator. The output results of the kernel execution are written to the buffers on the accelerator, as shown at block 218. Optionally, as shown at block 220, the accelerator may aggregate the data generated by the execution of the kernel. The data generated by the execution of the kernel, which may have been aggregated, is pushed by the accelerator to the host, as illustrated at block 222.

Accordingly, the disclosed method for distributed function execution across a hybrid system overcomes several drawbacks of using currently available RPC schemes in connection with OpenCL. For example, in current RPC methods the availability of buffers is synchronous and RPC cannot deliver data ahead of when it is required on the calling host. Furthermore, RPC does not aggregate data across remote function calls to optimize network utilization. Rather, RPC methods transmit buffers when each function call is made. The disclosed methods for distributed function execution across a hybrid system allow for the accelerator to push data to the host before the data is required by the host. In addition, the disclosed methods for distributed function execution across a hybrid system allow both the host and accelerator to aggregate data transmitted across the communications network connecting the host and the accelerator to optimize network utilization.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
    processing an application by a host including one or more processors, wherein the host comprises a data management and dispatch library;
    distributing at least a portion of the application to an accelerator for execution, wherein the accelerator comprises an OpenCL accelerator runtime environment configured to act as a proxy for the host;
    instructing the accelerator to create a buffer on the accelerator;
    instructing the accelerator to execute the portion of the application, wherein the accelerator writes data to the buffer; and
    instructing the accelerator to transmit at least a portion of the data in the buffer to the host before the application requests the portion of the data in the buffer;
    wherein the data management and dispatch library instructs the accelerator to aggregates the data in the buffer before transmitting the data to the host based upon one or more runtime conditions in the host, wherein the one or more runtime conditions in the host includes whether the portion of the data in the buffer will be read by the host during execution of the application.

2. The method of claim 1, wherein the buffer on the accelerator includes a designation as read-only, write-only or read-write.

3. The method of claim 2, wherein if the buffer is designated as read-only the accelerator does not transmit the data in the buffer to the host.

4. The method of claim 1, wherein instructing the accelerator to send the portion of the data in the buffer to the host further comprises:
   providing the accelerator a minimum transmission value;
   instructing the accelerator to aggregate the portion of the data in the buffer; and
   instructing the accelerator to transmit the portion of the data in the buffer when a size of the buffer exceeds the minimum transmission value.

5. The method of claim 1, wherein the portion of the application includes a computational loop and wherein instructing the accelerator to send the portion of the data in the buffer to the host further comprises instructing the accelerator to transmit the portion of the data in the buffer to the host upon completion of the computational loop.

6. The method of claim 1, wherein instructing the accelerator to send the data in the portion of the buffer to the host further comprises:
   providing the accelerator a transmission period;
   instructing the accelerator to aggregate the portion of the data in the buffer; and
   instructing the accelerator not to transmit the data in the buffer to the host more than one time during the transmission period.

7. The method of claim 1, further comprising:
   writing application data for execution of the portion of the application to the buffer on the accelerator; and
   wherein the host aggregates data transmitted from the host to the accelerator to hide communication latency incurred during separate transfers of constituent data.

\* \* \* \* \*